United States Patent
Stehlin

(10) Patent No.: US 7,213,146 B2
(45) Date of Patent: May 1, 2007

(54) SYSTEM AND METHOD FOR ESTABLISHING SECURITY PROFILES OF COMPUTERS

(75) Inventor: Jeffrey A. Stehlin, Suwanee, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1160 days.

(21) Appl. No.: 09/789,200

(22) Filed: Feb. 20, 2001

(65) Prior Publication Data

US 2002/0116630 A1 Aug. 22, 2002

(51) Int. Cl.
  *H04L 9/00* (2006.01)
  *H04K 1/00* (2006.01)
  *G06F 11/30* (2006.01)
  *G06F 12/14* (2006.01)
  *G06F 7/04* (2006.01)
  *G06F 11/00* (2006.01)
  *H04L 9/32* (2006.01)

(52) U.S. Cl. .............. 713/166; 713/188; 713/164; 713/165; 713/167; 726/23; 726/24; 726/25; 726/16; 714/2; 714/33; 714/38

(58) Field of Classification Search ........ 713/164–167, 713/200–202, 188; 714/37, 38; 707/9; 173/188, 173/166; 726/11, 23–26
See application file for complete search history.

(56) References Cited

U.S. PATENT DOCUMENTS

| | | | | |
|---|---|---|---|---|
| 5,440,723 A * | 8/1995 | Arnold et al. ............... 714/2 |
| 5,581,749 A * | 12/1996 | Hossain et al. ............... 707/10 |
| 5,950,195 A * | 9/1999 | Stockwell et al. ............ 707/4 |
| 5,991,791 A | 11/1999 | Siefert ........................ 709/100 |
| 6,026,440 A * | 2/2000 | Shrader et al. ............. 709/224 |
| 6,029,256 A * | 2/2000 | Kouznetsov ................. 714/38 |
| 6,125,457 A | 9/2000 | Crisan et al. ................. 714/36 |
| 6,154,844 A | 11/2000 | Touboul et al. ............. 713/201 |
| 6,158,010 A | 12/2000 | Moriconi et al. ........... 713/201 |
| 6,338,096 B1 * | 1/2002 | Ukelson ....................... 719/319 |
| 6,339,826 B2 * | 1/2002 | Hayes et al. ................. 713/166 |
| 6,598,083 B1 * | 7/2003 | Remer et al. ............... 709/229 |
| 6,681,331 B1 * | 1/2004 | Munson et al. ............. 713/201 |
| 6,779,117 B1 * | 8/2004 | Wells .......................... 713/200 |

* cited by examiner

*Primary Examiner*—Ayaz Sheikh
*Assistant Examiner*—Longbit Chai

(57) ABSTRACT

A computer system enables a user to define the system's security profile while automatically detecting whether the security profile being defined creates data hazards for the computer system. To achieve the foregoing, the computer system utilizes memory and a security application. The security application displays a list of security rules to a user and selectively enables the security rules based on user inputs. The security application causes the computer system to enforce the enabled security rules by modifying security settings of the computer system. For each enabled rule, the security application analyzes data that indicates which of the security rules, when enforced by the computer system, create a data hazard for a particular computer application. The security application then detects a data hazard, if the data indicates that the enabled rule creates a data hazard for the particular application and if the particular application is installed on the computer system. The security application, in response to detection of the data hazard, may disable the foregoing rule or notify the user of the detected data hazard.

27 Claims, 3 Drawing Sheets

SYSTEM AND METHOD FOR ESTABLISHING SECURITY PROFILES OF COMPUTERS

BACKGROUND OF THE INVENTION

1. Field of the Invention

The present invention generally relates to computer resource security and, in particular, to a system and method for defining a security profile of a computer and for automatically determining whether enforced security rules within the security profile are likely to cause errors during operation.

2. Related Art

To protect a computer system against vulnerabilities (e.g., attacks from hackers), the computer system is often "locked down" via a security application. As known in the art, a security application locks down a computer system by controlling a machine state or configuration of the computer system such that the computer system (e.g., an operating system within the computer system) enforces a set of security rules that prevent unauthorized users from accessing and/or modifying certain applications, files, and/or other resources within the computer system.

For example, a security application may set the configuration of the computer system such that the computer system enforces a rule that restricts which users may access a particular file. In this regard, the computer system may maintain a list, commonly referred to as an access control list, that identifies which users are authorized to access and/or use various computer resources. To cause the computer system to enforce the foregoing rule, the security application modifies the access control list such that the list indicates which users may access the particular file. When a user attempts to access this file, the computer system first checks the access control list to determine whether or not the user is one of the specified users that may access the file. If the user is one of the specified users, then the computer system allows the access to occur. However, if the user is not one of the specified users, then the computer system prevents the access and displays a message to the user indicating that access to the requested file has been denied.

To enable selection of a desired level of security, the security application normally includes data that defines a list of security rules that may be enforced by a computer system. The security application displays this list of security rules and allows a particular user or set of users, referred to herein as the "system administrator," to select which of the displayed rules that the system administrator would like enforced by the computer system. The security application, in turn, modifies the machine state or, in other words, the configuration of the computer system such that the computer system enforces the security rules selected by the system administrator.

Note that the security application normally sets the configuration of the computer system, and the computer's operating system enforces the security rules based on the settings controlled by the security application. In other words, the security application causes the operating system to enforce the selected rules by manipulating the configuration of the computer system. Thus, once the security application has set the configuration of the computer system, the security application usually provides no further functionality in enforcing the selected rules. However, when desired, the security application may change the computer system's settings in order to change which rules are enforced by the operating system in response to inputs for changing the security profile from the system administrator.

As described above, the system administrator selects which security rules should be enforced based on inputs from the system administrator, and the degree to which the computer system is locked down by the security application depends on the rules selected by the system administrator. Generally, the more rules that are enforced, the more secure the system becomes and, in other words, the more the system is locked down. Thus, if the system administrator desires to have a more secure computer system, the system administrator typically selects more rules for enforcement and/or selects particular rules that provide a particularly secure environment in areas of interest to the system administrator. However, in general, the compatibility of the computer system decreases as the security of the computer system increases. Therefore, if security is not a high priority to the system administrator, then he or she may select for enforcement fewer rules and/or rules that do not provide a high level of security, thereby reducing the degree to which the computer system is locked down.

Moreover, the degree to which the computer system is locked down by the security application depends on the competing interests of system security and system compatibility. Therefore, the rules selected for enforcement usually vary from computer system to computer system based on the desires of the system administrators in establishing the security profile of each of the computer systems. As used herein, a "security profile" refers to the collective set of security rules that have been selected for locking down a computer system in order to prevent unauthorized users from accessing and/or modifying certain resources within the computer system. Security applications that set the configuration of a computer system to induce the computer system to enforce the selected security rules or that, in other words, set the security profiles of computer systems are well known in the art and are often referred to as "lock down products" or "lock down applications." Normally, a security application only allows the system administrator or a user designated by the system administrator to change the computer system's security profile.

Since the security profiles of computer systems typically vary from computer system to computer system, most security applications do not provide a standard set of security rules for implementation. In this regard, most security applications list for the system administrator each security rule that may be selected for enforcement. The system administrator then reviews the displayed list of rules and selects the rules that the administrator would like enforced by the computer system and, in other words, added to the security profile of the computer system.

Unfortunately, as the need for more secure systems has increased, the list of security rules from which a system administrator may select in defining a computer system's security profile has increased as well. Indeed, the process of selecting which rules should be included in the computer system's security profile can be a tedious and time consuming process. Furthermore, if the system administrator is not substantially familiar with the ramifications of selecting many of the rules, then it can be difficult for the system administrator to select the appropriate set of rules that provides the computer system with the desired level of security.

More particularly, in defining a security profile for a computer system, the system administrator may select one or more rules that cause problems or errors to occur during operation, depending on the computer system's configuration. For example, the system administrator may select a security rule for enhancing the security of a particular application. However, when enforced, this security rule may unexpectedly and adversely affect the operation of another application. Thus, after activating the security profile, the other application may behave in an undesirable way.

Attempting to discover and remedy the undesirable effects introduced by the system administrator in selecting the security rules can be difficult and/or time consuming. In this regard, the system administrator typically traverses through the list of selected and/or unselected rules in order to determine why the resources of the computer system are not behaving as intended. However, understanding the ramifications of whether or not particular security rules are selected is paramount in such a debugging process, and not all system administrators are familiar enough with the security application and/or the computer system resources in order to make well informed decisions in debugging and/or changing the security profile. Further, in some situations, it is possible that the errors introduced by activating the security profile lock authorized users and even the system administrator out of certain resources of the computer system and, in particular, the security application, thereby making the process of correcting the security application even more difficult and problematic.

Thus, a heretofore unaddressed need exists in the industry for providing a system and method of enabling a system administrator to define a security profile for a computer system while minimizing the likelihood that the security profile, when activated, will introduce undesirable effects.

SUMMARY OF THE INVENTION

The present invention overcomes the inadequacies and deficiencies of the prior art as discussed hereinbefore. Generally, the present invention provides a system and method for defining a security profile for a computer and for automatically detecting data hazards caused by the security profile.

In architecture, a computer system in accordance with the present invention utilizes memory and a security application. The security application displays a list of security rules to a user and selectively enables the security rules based on user inputs. The security application causes the computer system to enforce the enabled security rules by modifying security settings of the computer system. For each enabled rule, the security application analyzes data that indicates which of the security rules, when enforced by the computer system, create a data hazard for a particular computer application. The security application then detects a data hazard, if the data indicates that the enabled rule creates a data hazard for the particular application and if the particular application is installed on the computer system. The security application, in response to detection of the data hazard, may disable the foregoing rule or notify the user of the detected data hazard.

The present invention can also be viewed as providing a method for locking down resources of a computer system. The method can be broadly conceptualized by the following steps: displaying a list of security rules; storing data that correlates at least one of the rules with a particular computer application; receiving an input identifying the one rule; enabling the one rule in response to the input; determining whether the particular computer application is installed on the computer system; detecting a data hazard, based on the determining step and the data, in response to the input identifying the one rule; receiving other inputs identifying others of the rules; enabling the other rules in response to the other inputs; receiving an activation request; and modifying security settings of the computer system based on which of the security rules are enabled during the step of receiving an activation request.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
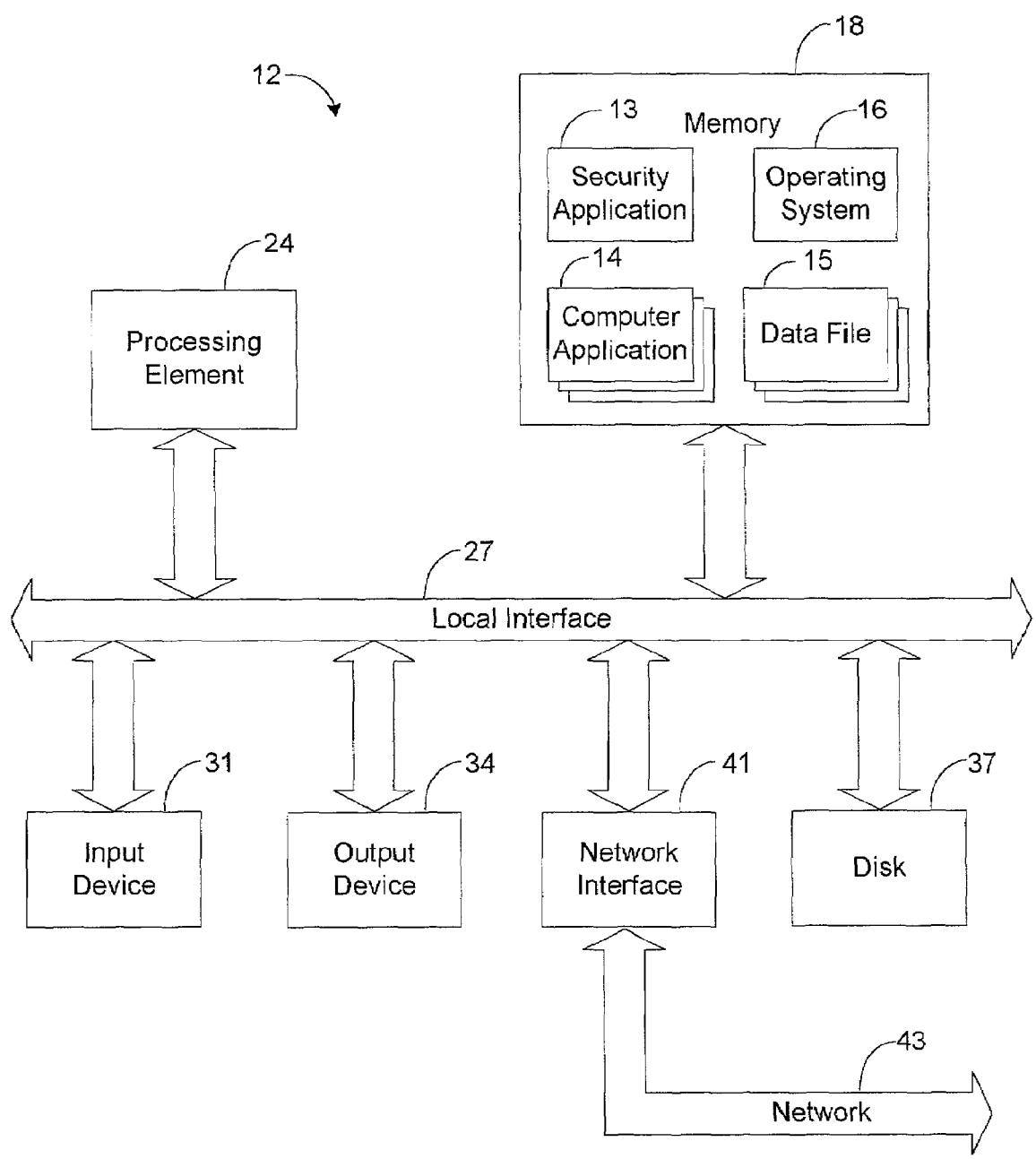
FIG. 1 is a block diagram illustrating a computer system employing a conventional security application.

FIG. 1 depicts a computer system 12 that employs a security application 13 of the prior art. The computer system 12 includes various computer applications 14, data files 15, and an operating system 16 stored in memory 18. The computer applications 14 may comprise any known computer applications for performing any programmed functionality when executed by the computer system 12. Windows NT, Microsoft Outlook, and Microsoft BackOffice are all examples of conventional computer applications that may comprise the computer applications 14 shown by FIG. 1. The operating system 16, via well-known techniques, is configured to control the operation and resources of the computer system 12. A primary function of the operating system 16 is to control when the instructions of applications 13 and 14 are executed by controlling when these instructions are interfaced with a processing element 24, such as a digital signal processor (DSP) or a central processing unit (CPU), for example.

Through well-known techniques, the processing element 24 is configured to execute the instructions transmitted to it. In executing these instructions, the processing element 24 may communicate to and drive the other elements within the system 12 via a local interface 27, which can include one or more buses. Furthermore, an input device 31, for example, a keyboard or a mouse, can be used to input data from a user of the system 12, and an output device 34, such as a screen display or a printer, can be used to output data to the user. A disk storage mechanism 37 can be connected to the local interface 27 to transfer data to and from a nonvolatile disk (e.g., magnetic, optical, etc.). The system 12 can be connected to a network interface 41 that allows the system 12 to exchange data with a network 43.

The security application 13 includes data that defines a list of security rules for preventing unauthorized access and/or modification of certain applications 14, files 15, and/or other resources within the computer system 12. In other words, the security application 13 includes data that defines a list of security rules for locking down the computer system 12. For example, one of the rules, when enforced, may prevent a certain class of user from accessing a particular application 14. Other examples of rules typically included in lists defined by conventional security applications 13 for locking down a computer system 12 are well-known in the art and will not be described in detail herein.

When invoked for the first time, the security application 13 normally provides a list of options, via output device 34, to the user of the system 12. This user is normally considered to be a system administrator (i.e., a user authorized to set and/or change the security profile of the system 12). One of the displayed options is to enable selection of a new security profile to be implemented by the security application 13. Upon selection of this option, the security application 13 is configured to display to the system administrator, via output device 34, a list of the security rules defined by the data within the security application 13. The system administrator may analyze these rules and select, via input device 31, the rules that he or she would like to have enforced. Note that one of the rules usually selected is to allow only a certain class of user to modify the security profile. Therefore, only the system administrator and/or users designated by the system administrator may normally make changes to the selected security profile once the security profile is activated.

After each desired rule has been selected, the system administrator preferably inputs, via input device 31, a request for activating the selected profile or, in other words, for enforcing the rules selected by the user. Upon receiving this input, the security application 13 changes the configuration of the computer system 12 such that the computer system 12 begins enforcing the selected rules. In other words, the security profile selected by the system administrator is activated.

More specifically, the security application 13, in response to the activation request, is configured to change the machine state of the computer system 12 such that the selected rules are enforced by the operating system 16 during operation of the system 12. As known in the art, the machine state of a computer system 12 refers to mathematical values stored within the computer system 12 that indicate the computer system's current status. As an example, the machine state includes, but is not limited to, the values of the computer system's flags, registers, and counters. Some of the values of the machine state pertain to and control security within the computer system 12.

For example, one of the registers (not shown) within the computer system 12 may include a value or a flag indicative of whether any access restrictions to a particular application 14 or file 15 exist. When the system administrator has selected, via security application 13, a rule for restricting access to this particular application 14 or file 15, the security application 13, upon activation, changes the foregoing value within the register to indicate that access to the particular application 14 or file 15 has been restricted. The security application 13 may also store in the register or other location data indicative of which users are authorized to access the application 14 or file 15 or indicative of which users are restricted from accessing the application 14 or file 15.

Before invoking or retrieving the particular application 14 or file 15, the operating system 16 analyzes the foregoing register to determine whether or not to access the particular application 14 or file 15. If the register indicates that access is not restricted, then the operating system 16 invokes or retrieves the application 14 or file 15. However, if the register indicates that access is restricted, then the operating system 16 takes further steps to determine whether or not the requesting user is authorized to access the application 14 or file 15. More specifically, the operating system 16 analyzes the data previously stored by the security application 13 that indicates which users are authorized to access or prevented from accessing the particular application 14 or file 15. Based on this data, the operating system 16 either accesses or refrains from accessing the particular application 14 or file 15.

Note that, in the foregoing example, the security application 13 performs no functionality once the machine state is set by the security application 13. In this regard, the security application 13 merely sets the machine state of the computer system 12 such that the operating system 16, via normal operation, enforces the rule selected for enforcement.

Furthermore, the foregoing example is presented for illustrative purposes. The enforceability of various other rules may be controlled by controlling the machine state according to various other techniques. Such techniques are well-known in the art and will not be described in detail herein.

After the system administrator selects and activates a security profile, the system administrator may decide to change the security profile. In this regard, the system administrator may invoke the security application 13 and then select an option for modifying the current security profile. In response, the security application 13 displays to the system administrator the list of rules that are presently being enforced and the list of rules that are presently not being enforced. The system administrator then selects, via input device 31, which of these rules to add to the security profile and/or which of these rules to remove from the security profile. Then, the system administrator inputs an activation request to activate the security profile, as changed by the system administrator. In response, the security application 13 changes the machine state of the computer system 12 as necessary in order to implement the security profile, as changed by the system administrator.

Unfortunately, the selected security profile does not always cause the computer system 12 to behave as expected by the system administrator. Indeed, activation of the security profile sometimes makes the system 12 unexpectedly more difficult to operate since the compatibility of the system 12 is often decreased as the security of the system 12 is increased. In particular, enforcement of certain security rules in response to activation of the security profile may cause operational errors in one or more applications 14. When this occurs, the system administrator typically attempts to change the security profile by adding rules to the security profile and/or by removing rules from the security profile. As set forth hereinabove in the Background of the Invention section, this process of correcting the security profile to achieve a desired effect can be difficult and time consuming, particularly when the system administrator is unfamiliar with the ramifications of adding and/or removing certain rules to and/or from the security profile. Indeed, it can be very difficult, in some instances, for the system administrator to undo or correct some of the undesirable effects introduced via activation of the security profile.

In the present invention, a security application defines a set of security rules that may be enforced to enhance the security of resources within a computer system, similar to the conventional security application 12. However, for each selected rule, the security application of the present invention investigates the configuration of the computer system and determines if activation of the selected security rule may cause an operational error in one or more of the resources of the computer system. If it is determined that such an operational error may occur, the security application may prevent enforcement of the rule (i.e., may remove the security rule from the security profile). Alternatively, the security application may notify the system administrator of the potential problem and allow the system administrator to make a more informed decision as to whether the rule should remain selected for enforcement.

Figure 2:
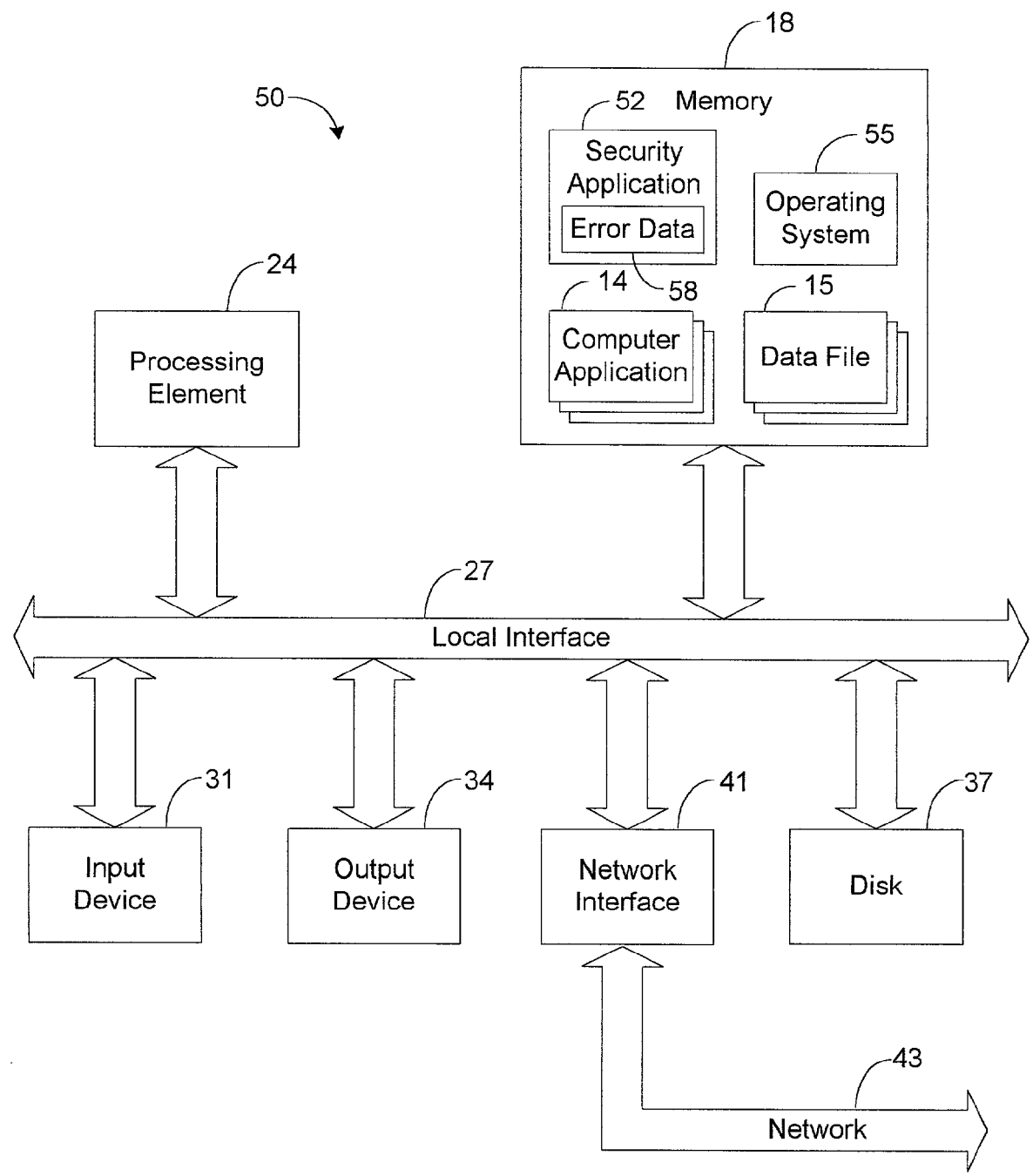
FIG. 2 is a block diagram illustrating a computer system employing a security application in accordance with the principles of the present invention.

FIG. 2 depicts a computer system 50 that may be employed to implement the present invention. Similar to conventional computer system 12, system 50 includes one or more computer applications 14 and data files 15 stored in memory 18 along with an operating system 55. The operating system 55, similar to conventional operating system 16, controls the operation and the resources of the system 50 and, in particular, controls the interfacing of instructions with a processing element 24. In controlling the resources of the system 50, the operating system 55 may employ many of the same techniques employed by conventional operating system 16.

The system 50 also includes a security application 52 configured in accordance with the principles of the present invention. The security application 52 can be implemented in software, hardware, or a combination thereof In the preferred embodiment, as illustrated by way of example in FIG. 2, the security application 52 of the present invention along with its associated methodology is implemented in software and stored in memory 18.

Note that the security application 52, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the security application 52 may be magnetically stored and transported on a conventional portable computer diskette.

As in conventional computer system 12, the processing element 24 of the system 50 may communicate to and drive the other elements within the system 50 via a local interface 27, which can include one or more buses. Furthermore, an input device 31, for example, a keyboard or a mouse, can be used to input data from a user of the system 50, and an output device 34, such as screen display or a printer, can be used to output data to the user. A disk storage mechanism 37 can be connected to the local interface 27 to transfer data to and from a nonvolatile disk (e.g., magnetic, optical, etc.). The system 50 can be connected to a network interface 41 that allows the system 50 to exchange data with a network 43.

Similar to conventional security application 13, the security application 52 includes data that defines a list of security rules for preventing access and/or modification of certain applications 14, data files 15, and/or other resources within the computer system 50. The list of rules defined by the security application 52 may be the same list of rules defined by conventional security application 13. When invoked, the security application 52 provides a list of options, via output device 34, to the user of the system 50. The user that initially invokes the security application 52 is considered to be a system administrator.

To enable selection of a security profile, the security application 52 displays, via output device 34, the list of security rules defined by the security application 52. The list of rules may be categorized as taught in copending U.S. patent application entitled, "System and Method for Categorizing Security Profile Rules within a Computer System," filed on Jan. 12, 2001, and assigned Ser. No. 09/760, 236, which is incorporated herein by reference. Similar to conventional system 12, the system administrator, via input device 31, selects which rules should be enforced and/or which rules should not be enforced upon activation of the security profile being defined by the system administrator. Based on the inputs provided by the system administrator, the security application 52 changes its data to indicate that only the rules selected by the system administrator are "enabled." A rule is "enabled" by indicating that it is presently selected for enforcement, and a rule is "disabled" by indicating that the rule is presently not selected for enforcement.

For each rule selected by the system administrator, the security application 52 is configured to determine whether or not the selected rule, when enforced, may cause an operational error in any of the resources of the computer system 50, such as any of the applications 14 stored in memory 18. To enable the security application 52 to make such a decision, the security application 52 is configured to determine: (1) which resources are included in the system 50, and (2) if any of the selected rules may cause an operational error to occur in any of the resources determined to be in the system 50.

A convenient methodology for determining which resources are included in the system 50 is to query the operating system 55. In this regard, conventional operating systems 16 normally include data identifying each resource managed by the operating system 16, such as each installed application 14, for example. The operating system 55 of the present invention may be similarly configured. Thus, the security application 52 may be configured to transmit to operating system 55 a request to retrieve data indicative of which resources are included within system 50. In response, the operating system 55 may provide the requested data to the security application 52, which may utilize this data in determining whether any of the selected security rules, when enforced, may cause an operational error.

To enable the security application 52 to determine which of the selected rules may cause operational errors, the security application 52 preferably includes error data 58, as shown by FIG. 2. The error data 58 preferably indicates which security rules, when enforced, may cause operational errors in which computer resources. For example, the error data 58 may indicate that a particular security rule, when enforced, may cause an operational error in a particular application 14, such as Microsoft Outlook, for example. Therefore, in response to selection of the particular rule for inclusion into the security profile being defined by the system administrator, the security application 52 analyzes the error data 58 and, based on the error data 58, determines that selection of the particular rule may lead to an operational error, if the particular application 14 is run on the system 50.

If the security application 52 determines that the particular application 14 is not installed on the system 50, then it is not likely that the operational error will occur. Hence, it may be desirable for the security application 52 simply to enable the particular rule and to take no action to inform the system administrator about the potential operational error or to prevent the potential operational error. However, if the security application 52 determines that the particular application 14 is installed on the system 50, then it is more likely that the operational error will occur. Hence, the security application 52 preferably takes further action to inform the system administrator about the potential error and/or to prevent the potential operational error form occurring.

In particular, the security application 52 may display a message, via output device 34, indicating that selection of the particular rule may cause an operational error in the particular application 14. The message may also provide information describing the nature of the operational error. Such information may be defined in the error data 58. Upon reviewing the message, the system administrator may then make a more informed decision about whether or not the system administrator would like the particular rule to remain selected. If, in light of the message, the system administrator determines that selection of the rule would be undesirable, the system administrator may deselect the particular rule. In such a case, the security application 52 ensures that the particular rule is disabled.

However, if the system administrator determines that he or she would rather have the particular rule enforced, thereby risking an occurrence of the operational error, then the system administrator may refrain from deselecting the particular rule. In such a case, the security application 52 ensures that the particular rule is enabled.

In another embodiment, the security application 52 may prevent the operational error by automatically disabling the particular rule. In this embodiment, it is not necessary for the system administrator to be informed of the potential operational error, although the system administrator may be so informed, if desired. By disabling the particular rule, the security application 52 ensures that the particular rule is not enforced by the system 50 upon activation of the security profile, thereby ensuring that the potential operational error will not occur.

After each desired security rule has been selected, the system administrator inputs, via input device 31, an activation request for activating the security profile being defined by the system administrator. In response, the security application 52 modifies the machine state of the computer system 50 such that, during any subsequent operation, the enabled security rules are enforced by the computer system 50 (e.g., by operating system 16) and the disabled security rules are not enforced by the computer system 50. The techniques used to update the machine state of system 50 should be similar to the techniques employed by conventional security application 13 in updating the machine state of conventional system 12.

Note that to facilitate the selection of security rules by the system administrator, the security application 52 preferably enables the system administrator to select a default level of security protection. For example, in one embodiment, the system administrator is given the option to select one of four default levels of security protection: "blank protection," "low protection," "medium protection," and "high protection." Note that other default levels of protection may be implemented in other embodiments.

When the default level of "blank protection" is selected by the system administrator, each security rule is disabled by default. Thus, to define a desired level of protection after selecting the default level of "blank protection," the system administrator manually selects, via input device 31, each security rule that is to be enforced upon activation of the security profile being defined by the system administrator. In other words, the system administrator manually controls which rules are enabled and, therefore, enforced upon activation of the security profile. If a security rule is not manually enabled (i.e., selected for enforcement) by the system administrator, then the rule remains disabled by default and is not enforced upon activation of the security profile. Thus, when the default level of "blank protection" is selected by the system administrator, the system administrator defines the security profile through techniques similar to those used to define the security profile of conventional system 12.

When the default level of "low protection" is selected by the system administrator, certain rules are enabled by default, and the remainder of the rules are disabled by default. In this regard, the programmer of the security application 52 attempts to guess which rules a system administrator would want enabled if the system administrator only wants a low level of security for a computer system. The programmer then programs the security application 52 such that only the rules that provide security without significantly affecting compatibility, in the opinion of the programmer, are enabled by default. If the system administrator is aware of certain security rules that he or she would like enabled or disabled, then the system administrator may manually enable or disable these rules via input device 31. The rules that are not manually enabled or disabled by the system administrator maintain their default status.

Thus, when the system administrator inputs the activation request, the only security rules included in the security profile and, therefore, enforced by the system 50 are the security rules: (1) manually enabled by the system administrator or (2) enabled by default and not manually disabled by the system administrator. As a result, it is not necessary for the system administrator to analyze each security rule to determine whether or not he or she would like the rule enabled or disabled. Instead, the system administrator may choose to manually control the status of security rules of particular interest to the system administrator and to rely on the selections of the programmer for the rules that the system administrator is either less interested in or less familiar with.

The remaining levels of protection (i.e., "medium protection" and "high protection") are similar to the level of "low protection" in that the programmer enables certain rules by default and disables certain rules by default. However, the programmer should program the security application 52 such that a different set of rules is enabled by default for each level of protection. For example, the programmer preferably enables by default more rules for "medium protection" than for "low protection," and the programmer preferably enables by default more rules for "high protection" than for "medium protection." Thus, as described above for "low protection," only security rules that do not significantly impact compatibility may be enabled by default. However, for "medium protection," the programmer may assume that the system administrator is more concerned with security and, therefore, more security rules that significantly impact compatibility may be enabled by default. The programmer may further assume that the system administrator in selecting "high protection" may be particularly concerned with security, and therefore, each security rule that significantly improves security may be enabled by default regardless of the rule's impact to compatibility. Note that it is possible for each rule to be enabled by default when the system administrator selects the default level of "high protection." In any event, for each of the latter three default levels of protection (i.e., "low," "medium" and "high"), there is a different set of rules that are enabled by default.

To assist the system administrator in selecting a default level of protection, the programmer may provide to the system administrator information (e.g., a manual) informing the system administrator of the considerations utilized in setting the default status of the rules. Thus, the system administrator, based on the desired degree of security and compatibility, may select one of the default levels of protection and then manually enable or disable each rule of particular interest to the system administrator. Since the system administrator relies on the programmer to set the status of at least some of the rules by default, the burden on the system administrator is reduced. Note that other categories and other numbers of categories may be used to enable and disable different sets of rules by default in other embodiments. Further, as described above, the system administrator may select the level of "blank protection" and manually enable each desired rule if the system administrator for some reason does not want to rely on the default settings established by the programmer for the other default levels of protection.

Operation

The preferred use and operation of the computer system 50 and associated methodology are described hereafter.

Initially, the system administrator invokes the security application 52, which displays a list of security rules to the system administrator. In block 112 of FIG. 3, the system administrator selects from the list one or more rules that the system administrator would like enforced by the system 50. As described above, the system administrator may manually select one or more rules in block 112, or the system administrator may select one or more rules by selecting a default level of protection. For each rule selected by the system administrator, the security application 52 modifies its data to indicate that the rule is enabled. Note that if the system administrator selects a default level of protection, then the security application 52 automatically enables one or more rules based on the selected default level of protection. Further, if the rules are enabled and disabled by default, then the system administrator may have the option to manually change whether one or more of the rules is enabled or disabled.

Figure 3:
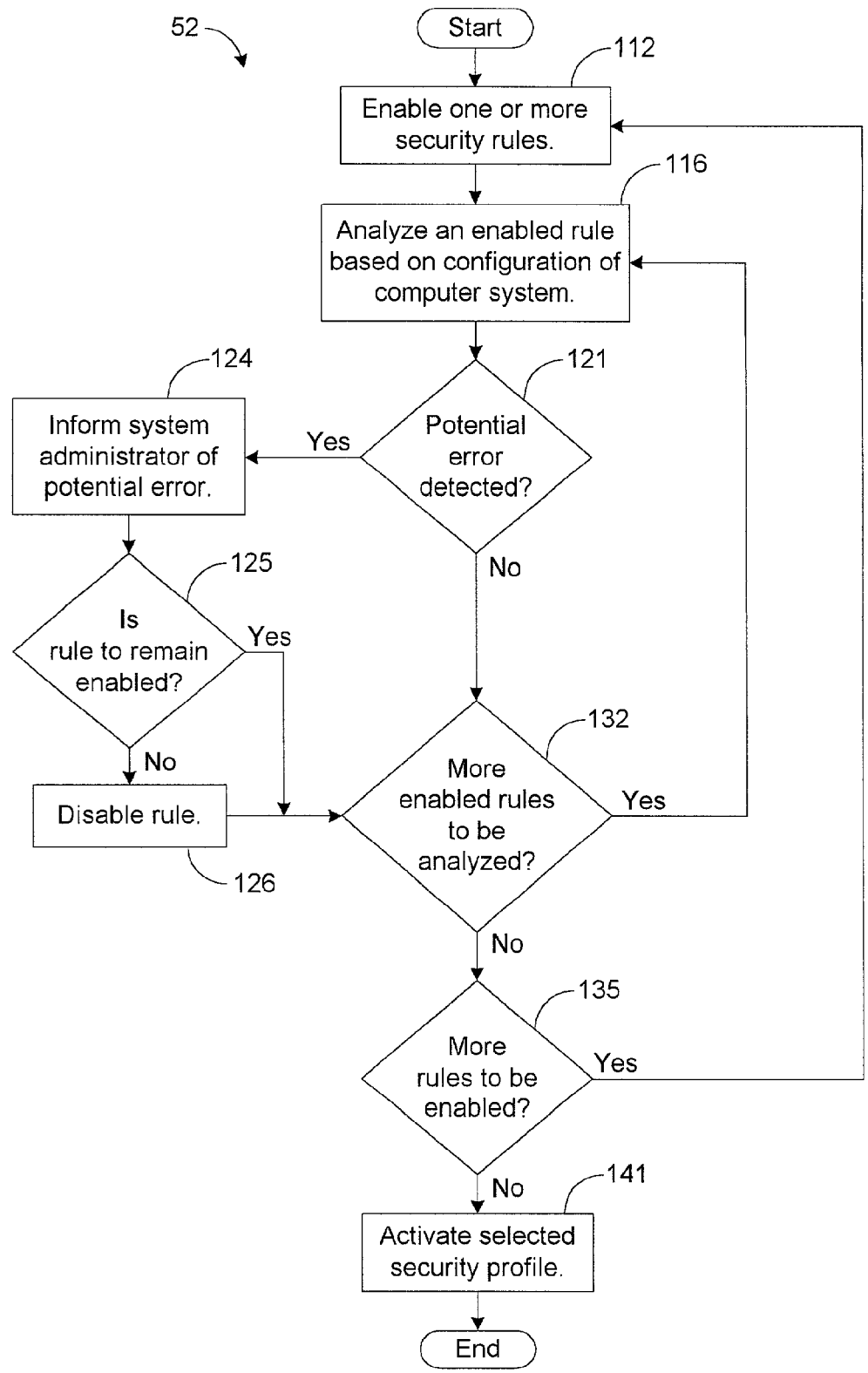
FIG. 3 is a flow chart illustrating the architecture and functionality of the security application depicted in FIG. 2.

In block 116, the security application 52 analyzes a rule that has been enabled in block 112. More specifically, the security application 52, based on the error data 58 and based on which resources are included in the system 50, determines whether enforcement of the rule may cause an operational error. In this regard, the error data 58 indicates which computer resources may experience an operational error if the rule is enforced, and the security application 52 investigates the configuration of the system 50 to determine whether any such resources are actually included in the system 50. If any such resources are included in the system 50, then the security application 52 detects a potential operational error or, in other words, a data hazard in block 121 and proceeds to blocks 124–126, as shown by FIG. 3. However, if no such resources are included in the system 50, then the security application 52 fails to detect a potential operational error in block 121 and skips blocks 124–126, as shown by FIG. 3.

To better illustrate the foregoing functionality, assume that the system administrator selects a particular rule in block 112. Further assume that the error data 58 indicates that this particular rule, when enforced, may cause an operational error to occur in a particular application 14 when the particular application 14 runs. Thus, if the particular application 14 is not installed on the system 50, then the security application 52, in block 121, should fail to detect a potential operational error and proceed directly to block 132. However, if the particular application 14 is installed on the system 50, then the security application 52, in block 121, should detect a potential operational error and proceed to blocks 124–126.

In block 124, the security application 52 displays a message to the system administrator via output device 34. This message informs the system administrator of the potential operational error detected by the security application 52. In response to the message, the system administrator may enter an input to deselect the particular rule. In response to such an input, the security application 52 disables the particular rule, as shown by blocks 125 and 126. However, if the system administrator refrains from entering the foregoing input, then block 126 is skipped, and the particular rule remains enabled. Block 121 and, if appropriate, blocks 124–126 are repeated for each rule enabled in block 112, as shown by block 132.

After the system administrator has selected each desired rule, the system administrator preferably enters, via input device 31, an activation request. In response to this activation request, the security application 52, in block 135, detects that no further rules are to be enabled. Thus, in block 141, the security application 52 modifies the configuration or machine state of the system 50 such that the system 50 (e.g., the operating system 55) enforces each rule that is presently enabled. In other words, the security application 52 activates the selected security profile.

It should be noted that it is possible to remove blocks 124 and 125 from FIG. 3. In this regard, upon the detection of a potential operational error in block 121, the security application 52 can be configured to proceed to block 126 without performing blocks 124 and 126. In other words, the security application 52 can be configured to automatically disable the rule being analyzed, thereby ensuring that the potential operational error is prevented.

By implementing the techniques described herein, potential operational errors caused by enforcement of selected security rules are either automatically prevented or revealed. As a result, it should be easier for the system administrator to define a desirable security profile.

Note that a problem with implementing the present invention pertains to discovering which resources may be adversely impacted by which security rule, thereby making it difficult for a programmer to define error data 58. In particular, analyzing the security rules in relation to the potential resources that may be included in the system 50 in order to identify potential operational errors can be a difficult and time consuming process. Indeed, the costs associated with discovering the necessary information for defining the error data 58 may be prohibitive.

Thus, initially, it may be desirable to provide security application 13 to customers and to define, via conventional security application 13, the same security rules defined by security application 52. As customers experience errors in operating some of the computer resources after activating a security profile via security application 13, the customers are likely to report these operational errors to agents of the retailer and/or manufacturer. These actual operational errors could be debugged by the agents of the retailer and/or manufacture to determine which security rules are causing errors in which resources. While servicing complaints from the customers, the agents could log which security rules were determined to cause operational errors with which computer resources. The agents could also log the nature of the foregoing problems. Thus, the information logged by the agents could be used by one or more programmers of security application 52 to define the error data 58. Since the actual operational errors encountered by the customers are going to be debugged in any event, the added cost of logging the results of the debug processes, as described above, is relatively small. Thus, it should be possible to implement the security application 52 of the present invention at a reasonable cost.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer system, comprising:
   memory for storing a plurality of computer applications; and
   a security application configured to display a list of security rules to a user and to enable said user to select one of said rules, said security application configured to correlate, based on data stored in said memory, said one rule with a particular computer application, said security application further configured to determine whether said particular application is stored in said memory and to detect, in response to selection of said one rule by said user, a data hazard based on said data and if said particular application is stored in said memory, said data hazard resulting from selection of said one rule by said user.

2. The system of claim 1, wherein said computer system further comprises:
   an operating system for controlling resources of said computer system,
   wherein said security application is configured to determine whether said particular application is stored in said memory by communicating with said operating system.

3. The system of claim 1, wherein said security application is configured display a message in response to detection of said data hazard by said security application.

4. The system of claim 3, wherein said security application is configured to enable ones of said security rules based on user inputs and to lock down resources of said computer system by modifying security settings of said computer system based on which of said security rules are enabled when an activation request is received by said computer system.

5. The system of claim 1, wherein said security application is configured to disable said one rule in response to detection of said data hazard by said security application.

6. The system of claim 5, wherein said security application is configured to enable ones of said security rules based on user inputs and to lock down resources of said computer system by modifying security settings of said computer system based on which of said security rules are enabled when an activation request is received by said computer system.

7. The system of claim 1, wherein said security application is configured to make a determination, in response to said selection, whether said particular application is stored in said memory, wherein said security application is configured to detect said data hazard based on said determination.

8. The system of claim 1, wherein said one rule, when enforced, restricts access authorization to one of said computer applications without restricting access authorization to said particular application.

9. The system of claim 8, wherein detection of said data hazard by said security application indicates that a future operational error may occur in said particular application due to enforcement of said one rule by said computer system.

10. A computer system, comprising:
    means for storing a plurality of computer applications;
    means for defining a plurality of security rules and for locking down resources of said computer system by modifying security settings of said computer system based on which of said security rules are enabled, said locking down means configured to selectively enable said rules based on user inputs and to determine whether a particular computer application is stored in said storing means, said locking down means including data indicative of which of said security rules, when enforced, cause errors in a particular computer application, said locking down means further configured to detect a data hazard if said particular application is stored in said storing means and if one of said rules is enabled and is correlated with said particular application by said data.

11. The system of claim 10, wherein said locking down means is further configured to analyze said data in response to one of said inputs, said one input indicating selection of said one rule.

12. The system of claim 10, wherein said locking down means is configured to disable said one rule in response to a detection of said data hazard by said locking down means.

13. The system of claim 10, wherein said locking down means is configured to display a message in response to a detection of said data hazard by said locking down means.

14. The system of claim 10, wherein said locking down means is configured to detect said data hazard in response to a user input for selecting one of said security rules.

15. The system of claim 10, wherein said locking down means is configured to make a first determination, based on said data and in response to a user input for selecting one of said security rules, that said one security rule, when enforced, causes an error in said particular application and to make a second determination, based on said first determination, as to whether said particular application is stored in said storing means, and wherein said locking down means is configured to detect said data hazard based on said first and second determinations.

16. The system of claim 15, wherein said one security rule, when enforced, restricts access authorization to one of said computer applications without restricting access authorization to said particular application.

17. The method of claim 16, wherein said data hazard pertains to said particular application.

18. A method for locking down resources of a computer system, comprising:
    displaying a list of security rules;
    storing data that correlates at least one of said rules with a particular computer application;
    enabling one of said rules in response to a user input;
    determining whether said particular computer application is installed on said computer system;
    detecting a data hazard, based on said determining and said data, in response to said user input, said data hazard resulting from said enabling;
    enabling others of said rules in response to other user inputs; and
    modifying security settings of said computer system based on which of said security rules are enabled.

19. The method of claim 18, further comprising:
    displaying a message in response to said detecting.

20. The method of claim 18, further comprising:
    disabling said one rule in response to said detecting.

21. The method of claim 18, further comprising:
    correlating said one rule with said particular computer application in response to said enabling one of said rules; and
    performing said determining in response to said correlating.

22. The method of claim 18, wherein said one security rule, when enforced, restricts access authorization to a computer application installed on said computer system without restricting access authorization to said particular application, and wherein said data hazard pertains to said particular application.

23. A computer system, comprising:
    memory for storing a first computer application and a second computer application; and
    a security application configured to define a plurality of security rules and to lock down resources of said computer system by modifying security settings of said computer system based on which of said security rules are enabled by a user, said security application configured to receive a user input for selecting one of said security rules applicable to said first computer application, said security application configured to make a determination that said second computer application may experience a future operational error if said one security rule is enabled, said security application further configured to make a determination as to whether said second computer application is stored in said memory and to detect, in response to said user input, a data hazard based on each of said determinations.

24. The system of claim 23, wherein said security application is configured to display a message indicative of said data hazard in response to detection of said data hazard.

25. The system of claim 23, wherein said one security rule, when enforced, restricts access authorization to said first computer application without restricting access authorization to said second computer application.

26. The system of claim 25, wherein said future operational error results from enforcement of said one security rule by said computer system.

27. The system of claim 23, wherein said security application, in response to a detection of said data hazard, is configured to display an indication of said data hazard or to prevent said future operational error from occurring.

* * * * *